United States Patent Office 3,837,964
Patented Sept. 24, 1974

3,837,964

BENZOTRIAZOLE PRE-LAMINATION TREATMENT OF METAL SUBSTRATES

Joseph Bernard Cotton, Sutton Coldfield, and Peter Albert Mack and Raymond Price, Manchester, England, assignors to Imperial Chemical Industries Limited, London, and Imperial Metal Industries (Kynoch) Limited, Birmingham, England

No Drawing. Filed Jan. 17, 1972, Ser. No. 218,457
Claims priority, application Great Britain, Jan. 18, 1971, 2,279/71
Int. Cl. B32b *31/12;* C09j *5/02*
U.S. Cl. 156—331 7 Claims

ABSTRACT OF THE DISCLOSURE

Organic compounds, especially polymers, are bonded to copper, silver or cadmium surfaces by means of compounds containing a ligand group, especially a benzotriazole group, which will form a polymeric complex with the metal of the surface and a group reactive with the organic compound. The metal surface may be treated with the complex-forming compound before or during contact with the organic compound. The polymers may be prepared from polymer-forming components while in contact with the metal surface.

The present invention relates to a process for bonding copper, silver or cadmium and alloys based on one or more of these metals to organic compounds, especially polymers.

It is desirable for many purposes, for example the manufacture of insulated wires, to coat the surface of e.g. copper articles with organic compounds, particularly polymeric materials. It is usually important that such coatings should adhere strongly to the metal. The present invention relates to a method of bonding copper, silver, or cadmium articles to organic compounds to give coatings which adhere more strongly to the surface of the metal than those prepared using conventional methods, and to the use of this method to provide articles in which two metal surfaces are bonded together through such compounds.

According to the invention there is provided a process for bonding copper, silver or cadmium or alloys based on one or more of these metals to organic compounds which comprises treating the surface of the copper, silver or cadmium or alloy with a complex-forming compound which contains a group reactive with or having affinity for the organic compound and a ligand group which with loss of a proton can form with the copper, silver or cadmium a neutral, polymeric complex, and successively or simultaneously bringing the treated metal or alloy surface into contact with the organic compound.

The metal or alloy may be in strip, sheet, wire, powder or massive form. The copper-based alloys include alloys containing at least 50% of copper in conjunction with zinc, tin and/or nickel.

As examples of organic compounds which may be bonded to the metal or alloy there are mentioned especially polymers for example polyolefins such as polyethylene, polypropylene and poly-4-methylpentene-1, polystyrene, addition polymers such as polyvinyl chloride, polymethyl methacrylate, polytetrafluoroethylene condensation polymers such as polyamides, polyesters, polyurethanes, epoxy resins, urea-formaldehyde resins, melamine-formaldehyde resins, and phenol-formaldehyde resins, and silicones and natural and synthetic rubbers.

The polymer may be preformed or may be prepared, for example by polymerisation or polycondensation from polymer-forming components, when in contact with the metal.

The organic compounds which may be bonded to the treated metal or alloy surface include, in addition to polymers, long chain organic acids such as stearic acid as an example.

As examples of groups reactive with the organic compound there are mentioned amino, polyalkyleneimino, acylamido, hydroxy, methacryloylamido, carboxy, carbonamido, ureido, thiol, 1,2-epoxy, halogeno especially chloro, carboxylic ester groups which may be reactive themselves with groups present in the polymer or its polymerisable components or which may be attached to the groups present in the polymer by a suitable polyfunctional agent, such as formaldehyde or polyisocyanates.

As examples or groups which have affinity for the polymer there are mentioned any of the above reactive groups, and also groups which may have an affinity for the polymer or organic compound, for example in the case of very long chain aliphatic groups by 'entanglement' with the chains of the polymer.

These groups may be attached to the ligand directly or through a linking group, for example an oxygen or sulphur atom, or an alkylene, phenylene, benzo, amino, carbonyl, sulphonyl, arylazo, carbonamido, aminocarbonyl, s-triazinylamino, sulphonamido, or aminosulphonyl group or combination of any of these, and in which any hydrogen atom may optionally be substituted by any alkyl, alkenyl, cycloalkyl or aryl group or substituted derivative thereof.

The reactivity of these reactive groups will depend not only upon the nature of the group but also on its means of attachment to the ligand. For example an amino group attached directly to a deactivating group such as an aromatic nucleus as in 5-amino benzotriazole or which is sterically hindered will have a reduced reactivity and may not provide satisfactory adhesion with some polymers.

As examples of ligand groups there are mentioned those in 1,2,3-triazole, benzotriazole, naphthotriazole, benzimidazole, naphthimidazole, indazole, 2-mercaptothiazole, 2-mercaptobenzthiazole, 2-mercaptobenzoxazole, 2-mercaptobenzimidazole, dialkyl dithiocarbamates, alkyl xanthates and 1,4-dimercaptophthalazine.

The process of the invention may be carried out conveniently by immersing the metal surface in a solution of the complex-forming compound in a suitable solvent, e.g. water, alcohol, dioxan, dimethyl formamide, cellosolve, or mixtures thereof, removing the solvent by evaporation, and then bringing the surface into contact with the polymer or polymerisable components which will be desirably in a liquid, for example molten or softened, state to permit continuous and complete contact of the polymer over the whole of the metal surface. A solution of any convenient concentration, for example containing from 0.001% or in some cases less than 0.0005% to saturation of the complex-forming compound, may be used. In the case of those complex-forming compounds which give water-soluble salts, for example salts with alkali metals such as sodium, it is often convenient to use solutions of these salts in aqueous media.

If necessary the composite article is then treated to change the state of the polymer from liquid or softened state. In the case of rubber a vulcanisation process may be carried out or in the case of epoxy resins the components are allowed to partially react and then heated to complete the polymerisation.

Alternatively, in those cases wherein the complex-forming compound and the polymer or components thereof or organic compound do not react with each other readily in such a way as to decrease materially the complex-forming properties of the ligand, it is possible to dissolve the complex-forming compound in the polymer or components thereof or organic compound and then bring the solution and metal surface into contact and, if necessary, carry out any desirable after-treatment of the treated surface to bring about reaction of the polymer, components thereof or organic compound with the reactive group.

After the metal surface has been treated with the complex-forming compound it is not necessary to bring the treated surface into contact with the polymer immediately or after only a short delay, since the treated metal surface is stable and in general corrosion-resistant. Articles having such treated metal surfaces, suitable for reaction with a polymer or component thereof, are a further feature of the invention.

As examples of complex-forming compounds suitable for use in the process of the invention there are mentioned 5-[ω-(p-aminophenyl)nonanoylamino]-benzotriazole,
5-[ω-(m-aminobenzoyl)octanoylamino]-benzotriazole,
5-[ω-(2,4-diaminophenyl)caproylamino]-benzotriazole,
5-[ω-(p - aminobenzoylamino)carpoylamino] - benzotriazole,
5-(ε-aminocaproylamino)-6-chlorobenzotriazole,
5-(ε-aminocaproylamino)-6-methylbenzotriazole,
5-(ε-hydroxycaproylamino)-6-methylbenzotriazole,
5-(ε-aminocaproylamino)-6-methoxybenzotriazole,
5-(ω-carboxyvaleroylamino)-6-methoxybenzotriazole,
4-(ε-aminocaproylamino)-1,2-naphthotriazole,
4-(ω-aminododecanoylamino)-1,2-naphthotriazole,
4-(ε-hydroxycaproylamino)-1,2-naphthotriazole,
4-(ω-carboxyvalerylamino)-1,2-naphthotriazole,
4-(ε-methacryloyloxycaproylamino)-1,2-naphthotriazole,
6-(ε-aminocaproylamino)-1,2-naphthotriazole,
6-aminoacetylamino-1,2-naphthotriazole,
6-(β-carboxy propionylamino-1,2-naphthotriazole,
6-(ε-ureidocaproylamino)-1,2-naphthotriazole,
5-(ε-aminocaproylamino)benzimidazole,
5-(ω-aminododecanoylamino)-benzimidazole,
5-(ε-hydroxycaproylamino)-benzimidazole,
5-(ε-carboxyvalerylamino)-benzimidazole,
5-[di-(β-hydroxyethyl)aminocarbonyl]-benzimidazole,
5-(β-mercaptoethylaminocarbonyl)-benzimidazole,
5-[ω-(p-aminophenyl)dodecanoylamino]-benzimidazole,
5-[ε-(p-aminobenzoylamino)-acproylamino]-benzimidazole,
5-(ε-methacryloyloxycaproylamino)-benzimidazole,
5-(ε-aminocaproylamino)-6-methylbenzimidazole,
5-(ε-methacryloyloxycaproylamino) - 6 - methybenzimidazole,
5-(ε-aminocaproylamino)-6-chlorobenzimidazole,
5-[ε-(m-aminobenzoylamino)-caproylamino] - 6 - methoxybenzimidazole,
5-(ω-carboxyvalerylamino)-6-methoxybenzimidazole,
4-(ε-aminocaproylamino)-1,2-naphthimidazole,
4-(ε-hydroxycaproylamino)-1,2-naphthimidazole,
6-(ω-aminododecanoylamino)-1,2-naphthimidazole,
5-(ε-aminocaproylamino)indazole,
5-(ω-carboxyvalerylamino)indazole,
5-(ε-hydroxycaproylamino)-indazole,
5-(ε-methacryloyloxycaproylamino)-indazole,
6-(ε-aminocaproylamino)-2-mercaptobenzothiazole,
6-(ε-hydroxycaproylamino)-2-mercaptobenzothiazole,
6-(ω-aminododecanoylamino)-2-mercaptobenzothiazole,
6-(ω-carboxylvalerylamino)-2-mercaptobenzothiazole,
6-(ε-acetylaminocaproylamino)-2-mercaptobenzothiazole,
6-[ε-(p-aminobenzoylamino)caproylamino]-2 - mercaptobenzothiazole,
6-(ε-methacryloyloxycaproylamino)-2 - mercptobenzothiazole,
5-chloro-6-(ε-aminocaproylamino)-2 - mercaptobenzothiazole,
6-(ε-aminocaproylamino)-2-mercaptobenzoxazole,
6-(ε-aminododecanoylamino)-2-mercaptobenzoxazole,
6-(ε-hydroxycaproylamino)-2-mercaptobenzoxazole,
6-(ω-carboxyvalerylamino)-2-mercaptobenzoxazole,
6-[ω-(p-aminobenzoyl)-nonanoylamino]-2-mercapto benzoxazole,
6-(ε-methacryloyloxycaproylamino)-2 - mercaptobenzoxazole,
5-(ε-aminocaproylamino)-2-mercaptobenzimidazole,
5-(ε-hydroxycaproylamino)-2-mercaptobenzimidazole,
5-(ε-acetylaminocaproylamino)-2-mercaptobenzimidazole,
5-[5-(ε-methacryloyloxycaproylamino) - 2 - mercaptobenzimidazole,
5-[ε-(p-aminobenzoylamino)-caproylamino] - 2 - mercaptobenzimidazole,
5-(ε-aminocaproylamino)-1-methyl - 2 - mercaptobenzimidazole,
5-[4-di(β,γ-epoxypropyl)aminophenylazo]benzotriazole,
5-[4-(N-ethyl-N-β,γ - epoxypropylamino)phenylazo]benzotriazole
5-[4-(β-aminoethylamino)phenylazo]benzotriazole,
5-[2,4-bis[di(β-hydroxyethyl)amino]-*s*-triazin-6-ylamino] benzotriazole
5-[2,4-dichloro-*s*-triazin-6-ylamino]benzotriazole
potassium-N,N-di-(β-aminoethyl)-dithiocarbamate,
potassium-N-methyl-N-(p-amino benzyl)dithiocarbamate,
potassium-p-aminobenzyl xanthate,
6-(ε-aminocaproylamino)-1,4-dimercaptophthalazine,
6-(ε-hydroxycaproylamino)-1,4-dimercaptophthalazine,
6-(ω-carboxyvalerylamino)-1,4-dimercaptophthalazine,
6-(ω-methacryloyloxycaproylamino) - 1,4 - dimercaptophthalazine,
2-mercapto-4-(β-hydroxyethylaminocarbonyl)-5 - methylthiazole,
2-mercapto-4 - (β,β' - diaminodiethylaminocarbonyl) - 5-methylthiazole,
2-mercapto-4-(β-mercapto ethylaminocarbonyl-5 - methylthiazole.

The preparation of the above compounds, many of which are novel, may be in general carried out by the application of known general reaction to known intermediates. In some cases this procedure will furnish the desired complex-forming compound directly but in many cases it is necessary to use an intermediate or intermediates containing a group or groups which are stable and inert under the reaction conditions but which can be subsequently converted by known general methods into the desired reactive group and/or ligand group. Such a procedure is illustrated in Examples 1 and 2 wherein the acid chloride of an aminoacid in which the amino group has been protected by an o-phthaloyl group is reacted with a compound containing a triazole ligand group and a free amino group, and the phthaloyl group is subsequently removed by reaction with hydrazine.

When the polymeric material is a polyamide, the preferred reactive group is a group containing one or more reactive halogen atoms especially chlorine attached for example to an alkyl or substituted alkyl group or to a heterocyclic group.

As examples of such groups there may be mentioned the γ-chloro-β-hydroxypropyl and 2-chloro-1,3,5-triazinyl groups. These may be linked to the benzotriazole through an oxygen, nitrogen or sulphur atom either directly or through one or more additional linking groups such as alkylene, phenylene, amide, or azo groups. Benzotriazoles having reactive halogen groups attached in this manner are new compositions of matter and form a feature of this invention.

Compounds of this type may be prepared by the controlled reaction of cyanuric chloride with 5-aminobenzotriazole or 5-ε aminocaproyl aminobenzotriazole to give 5 - (2,4-dichloro-*s*-triazin-6-yl)amino benzotriazole or 5-(ε - 2,4 - dichloro-*s*-triazin-6-ylaminocaproyl-amino)benzotriazole. Other types of these compounds may be prepared for example by coupling benzotriazole-5-diazonium chloride on to aromatic amines such as aniline which are substituted on the ntirogen atom with groups such as γ-chloro-β-hydroxypropyl. As an example of the compounds which may be prepared by this method there may be mentioned 5[4-di(γ-chloro - β - hydroxypropyl)aminophenylazo]-benzotriazole.

When the polymeric material is an epoxy resin the preferred reactive groups are primary and secondary amino groups linked to the benzotriazole or other ligand through an alkylene or phenylene group and one or more additional linking groups such as amino, carbonamido, aminocarbonyl or azo. Benzotriazoles containing primary or secondary amino groups so attached are new compositions of matter and form a feature of the invention.

These compounds may be prepared by conventional methods. For example 5-aminobenzotriazole is reacted with an acyl chloride carrying a protected amino group, e.g. a phthalimido group, and the protecting group is subsequently removed. Alternatively benzotriazole 5-carboxylic acid may be reacted with thionyl chloride to give the acid chloride which immediately forms a polymeric amide. When heated with an amide such as ethylene diamine, this polymeric amide behaves as a pseudo acid chloride, breaking down and recombining with the amine to form a 5-β-aminoethylaminocarbonyl benzotriazole. Preferred compounds are prepared by reacting this pseudo acid chloride with a polyamine such as diethylene triamine or polyethylene imine. Other compounds may be prepared by coupling benzotriazole-5-diazonium chloride on to aromatic amines such as aniline, *m*-phenylene diamine, N-β-aminoethyl aniline or N,N-di(β-aminoethyl)aniline or other methods conventionally employed in the preparation of azo compounds.

When the polymeric material is polymethyl methacrylate the preferred reactive group is a polymerisable unsaturated group such as an acryloyl or methacryloyl group attached to the ligand through an oxygen or nitrogen atom and optionally further linking groups to the benzotriazole. Benzotriazoles having such polymerisable unsaturated groups so attached are new compositions of matter and form a feature of the invention.

Such compounds are readily prepared by the reaction of an acid chloride containing a polymerisable unsaturated group such as acryloyl chloride with benzotriazole compounds containing an amino group such as 5-amino benzotriazole or 5-ε aminocaproylamino benzotriazole. It is advantageous, although not essential, to have more than one polymerisable unsaturated group attached to the benzotriazole. Such a compound may be prepared by reacting acryloyl chloride with N,N-di(β-aminoethyl)aniline to give N,N-di(β-acryloylaminoethyl)aniline which is then coupled with benzotriazole-5-diazonium chloride to give 5-[4-di-(β acryloyl - aminoethyl)aminophenylazo]benzotriazole.

There will now be given some embodiments of the practical application of the present invention.

EMBODIMENT 1

The present invention may be ued for bonding copper sheet to sheets of dielectric material in the manufacture of printed circuit boards. Thus there can be prepared wide sheets of copper having a thickness about 0.001 to 0.003 inch either by electrodeposit and subsequent removal from an electrically conductive drum, or by the repeated rolling of copper stock. This is then treated with a solution of e.g. 5-(ε-aminocaproylamino)benzotriazole dissolved in ethanol and water, dried, and subsequently coated with a layer of epoxy resin which is then cured. The benzotriazole compound bonds well to the copper surface and is also able to bond to the epoxy resin to provide an adequate peel strength between the copper and the resin.

In a modification of this embodiment, there can firstly be prepared a partially cured sheet of epoxy resin which is treated at least in the areas upon which copper is to be deposited by a solution of 5-(ε-aminocaproylamino)-benzotriazole in ethanol and water, followed by an initial electroless deposit of copper and the subsequent electrodeposit of the necessary thickness of copper. After suitable masking, copper can be removed from the areas of the epoxy resin where it is not required, and the resin can be fully cured.

EMBODIMENT 2

The invention also finds application in the manufacture of heat exchangers by replacing the current practice of brazing copper components of heat exchangers together so that those components are bonded together through the use of the present invention. Thus, the areas of each copper component that are to be bonded are treated with a suitable benzotriazole or other complex-forming compound selected from those recited above, and those treated surfaces are then coated with a suitable polymer in the uncured state. The polymer is selected on the basis of resistance to the temperature to which the heat exchanger will be subjected when in use, and resistance to the physical and chemical environment to which that polymer will be subjected. The components of the heat exchanger are assembled together with the uncured polymer areas pressed together, and the polymer is then cured to bond the heat exchanger together.

EMBODIMENT 3

In this embodiment the present invention is used to bond copper sheet to proprietary wooden boarding such as that known as "chipboard" to prepare a composite roof structure. The wooden structure of the roof is prepared either *in situ* or by prefabrication in separate panels, and each surface which is to receive a copper sheet is first treated with a suitable adhesive which will form a tight bond with the wooden surface. There is then pressed on to the surface of the adhesive a copper sheet of which the contacting surface has been pretreated with a suitable benzotriazole or other compound discussed above. A good bond is achieved between the benzotriazole and the adhesive by a positive cure of the adhesive or by pressure bonding. This embodiment illustrates a particular benefit which is achieved with the use of benzotriazoles in that whereas copper is severely deleterious to almost all organic compounds, and particularly to polymers and adhesives by causing a breakdown of the organic structure the coating of the copper surface with the benzotriazole compound not only produces a good bond with that surface but also serves to minimise contact between free copper ions and the organic compound and thereby greatly reduces the breakdown of the organic compound. This is of particular relevance to this embodiment in that the strength of the bond that is achieved between the copper sheets and the adhesive does not deteriorate quickly.

EMBODIMENT 4

In this embodiment copper, cadmium or silver articles are provided with a coating of a polymer by a first treatment with a suitable benzotriazole or other compound discussed above, followed by application of the polymer to the treated surface in the softened state, and subsequent hardening of the polymer. This embodiment has particular application in the preparation of decorative surfaces by the use of a transparent polymer such as an acrylic resin which can be applied to a bright copper or silver surface and which will, together with the anti-corrosive effect of the benzotriazole compound itself, maintain that bright surface for a substantial period of time, Articles manufactured in accordance with this embodiment will find application in cosmetic wares, jewellery and architectural and shop-fitting displays. The embodiment can be extended, particularly for cadmium, to the preparation of polymer-coated steel in that the copper or cadmium can be present as a thin coating on a steel surface, for example produced by electroplating or flash evaporation, and can then have effect in bonding the polymer to the steel through the medium of a suitable benzotriazole compound.

The invention is illustrated but not limited by the following Examples in which all parts and percentages are by weight unless otherwise stated.

Example 1

Copper strips, one inch wide, four inches long, and 1/16" thick are cleaned by rubbing with fine carborundum paper and degreased by soaking in hot dimethylformamide. One pair of strips is immersed in a solution of 10 ml. of nitric acid and 5 g. of ferric chloride in 85 ml. of water for 5 minutes and then washed twice with distilled water and dried in air. Another pair of strips is immersed in a solution of 2 g. of 5-(ε-aminocaproylamino)benzotriazole in a mixture of 75 ml. of ethanol and 50 g. of water for 5 minutes and then washed with ethanol and dried in air.

An adhesive composition is prepared by mixing 15 parts of a partially polymerised epoxy derivative of bisphenol A sold under the trade name "Epikote 828" ("Epikote" is a registered trademark) with 12.5 parts of *m*-phenylenediamine, heating the mixture to 65° C., until a solution is obtained, mixing with a further 85 parts of "Epikote 828" and cooling, to room temperature. A few drops of the adhesive composition is applied to the end of each of the copper strips and the pairs of strips clamped together, the adhesive forming a bond between about 1 square inch of each of the two strips in each pair. The strips are then heated at 100° C. in an air oven for 4 hours. The tensile shear strength of the joints is then tested by pulling the strips apart on a laboratory Instron machine. The strips treated with ferric chloride/nitric acid solution, a commercially used method of bonding copper to polymer, provided a bond strength of about 477 lb. per sq. in. While the strips immersed in the 5-(ε-aminocaproylamino)benzotriazole solution provided a bond strength of about 945 lb. per sq. in.

The 5 - (ε - aminocaproylamino)-benzotriazole used above is prepared as follows:

A solution of 87.5 parts of ε-phthalimido caproyl chloride in 150 parts of acetone is added to a stirred solution of 42 parts of 5-aminobenzotriazole in 100 parts of pyridine during 30 minutes while the temperature of the mixture is maintained at 40° C. When the addition is complete the mixture is heated to the boil for 15 minutes, cooled, and drowned with 600 parts of water. The 5-(ε-phthalimidocaproylamino) benzotriazine which separates from solution is filtered off, washed with water and dried.

31 Parts of a 60% aqueous solution of hydrazine hydrate is added during 30 minutes to a stirred suspension of 22.5 parts of 5-(ε-phthalimidocaproylamino)benzotriazole in 250 parts of ethanol at the boil. After a further 2 hours at 75–80° C. The mixture is cooled to 40° C., acidified with hydrochloric acid and filtered to remove phthalhydrazide. The pH of the filtrates is adjusted to 7.0 with sodium hydroxide solution and then volume is reduced at 40° C. under vacuum until crystallisation of the product is effectively complete. The 5-(ε-aminocaproylamino)benzotriazole is then filtered off, washed with a little water and dried. [Analysis is: Found: Carbon, 58.1; Hydrogen, 6.9; Nitrogen, 27.9; $C_{12}H_{17}ON_5$ requires: Carbon, 58.3; Hydrogen, 6.9; Nitrogen 28.3%.]

5-(Aminoacetylamino)benzotriazole is prepared by a similar method using phthalimidoacetylchloride in place of ε-phthalimidocaproyl chloride. [Analysis: Found: Carbon, 50.3; Hydrogen, 5.1; Nitrogen, 36.6. $C_8H_9ON_5$ requires: Carbon, 50.25; Hydrogen, 4.75; Nitrogen 36.65%.]

Example 2

Copper strips, one inch wide, four inches long, and 1/16" thick are cleaned by sand blasting and degreased with trichloroethylene. One pair of strips is immersed in a solution of one g. of 5-(aminoacetylamino)benzotriazole in a mixture of 200 ml. of ethanol and 50 g. of water for 5 minutes and then washed with ethanol and dried in air. Two strips are bonded together by the method described in Example 1. The bond strength obtained by this process is about 1500 lb. per sq. inch while strips which had not been immersed in a solution of 5-(aminoacetylamino)benzotriazole provided a bond strength of about 1175 lb. per sq. inch.

Example 3

Copper strips prepared as in Example 2 are immersed in a solution of 1 g. of 5-[4-di(β,γ-epoxypropyl)aminophenylazo]-benzotriazole in 100 ml. of acetone at room temperature for 15 minutes and then washed with acetone and dried in air. Two strips are bonded together by the method described in Example 1. The bond strength obtained by this process is about 1500 lb. per square inch while strips which had not been immersed in the solution provided a bond strength of about 1175 lb. per square inch.

Example 4

Copper strips, one inch wide, four inches long, and 1/16" thick are cleaned by sand blasting and degreased with trichloroethylene.

An adhesive composition is prepared by mixing 15 parts of a partially polymerised epoxy derivative of bisphenol A sold under the trade name "Epikote 828" ("Epikote" is a registered trade mark) with 1.4 parts of m. phenylene diamine and 2.1 parts of 5-(ε-aminocaproylamino)-benzotriazole, heating the mixture to 60° and cooling to room temperature. A few drops of the adhesive composition is applied to the end of each of the copper strips and the pairs are clamped together, the adhesive forming a bond between about one square inch of the two strips in each pair. The strips are then heated at 100° in an air oven for 4 hours. Then tensile shear strength of the joints, as measured by pulling the strips apart on a laboratory Instron machine, is about 1900 lb. per square inch while the strength of comparable joints between strips bonded together with an adhesive composition not containing the 5-(ε-aminocaproylamino)-benzotriazole provided a bond strength of about 1200 lb. per square inch.

Example 5

A sheet of copper foil, six inches square and 0.004 inches thick is etched by immersion in a 30% aqueous solution of ammonium persulphate at room temperature for 2 minutes, washed with water, dried and degreased with trichloro-ethylene. The sheet is then immersed in a solution of one gram of 5-(ε-aminocaproylamino)-benzotriazole in a mixture of 2 ml. of 2N sodium hydroxide solution and 100 ml. of water at 60° for 10 minutes and then washed first with water, then with acetone and dried in air.

A printed circuit laminate is then produced by heating the copper foil in contact with 10 layers of glass cloth, impregnated with an epoxy resin, at 170° for 30 minutes under a pressure of 1000 p.s.i. The peel strength of the bond between the copper foil and the substrate, as measured on a laboratory Instron machine, is about 4.6 lb./inch width, while that of a control pressing prepared from untreated copper foil is 2.6 lb./inch width.

When the 5-(ε-aminocaproylamino)-benzotriazole used in the foregoing Example is replaced by one gram of the compound in column I of the following Table a laminate is obtained having the peel strength shown in column II of the Table.

| I | II (Lb./inch width) |
|---|---|
| 5 - [4 - (N - ethyl-N-β,γ-epoxypropylamino)-phenylazo]-benzotriazole | 3.5 |
| 5 - [β - (β - aminoethylamino)-ethylaminocarbonyl]-benzotriazole | 3.8 |
| 5 - [4 - (β - aminoethylamino)-phenylazo]-benzotriazole | 3.6 |

Example 6

A sheet of copper foil, six inches square and 0.004 inches thick is cleaned by rubbing with "Scotchbrite" and degreased with trichloroethylene. The sheet is then immersed in a solution of 0.5 gram of 5-[2,4-bis-[di-(β-hydroxyethyl)amino]-s-triazine-6-ylamino] - benzotriazole in a mixture of 5 ml. of 2N sodium carbonate solution and 95 ml. of water at room temperature for 10 minutes and then washed first with water, then with acetone and air dried.

A printed circuit laminate is then produced by heating the copper foil in contact with 10 layers of glass cloth, impregnated with an epoxy resin, at 170° for 30 minutes under a pressure of 1000 p.s.i. The peel strength of the bond between the copper foil and the substrate, as measured on a laboratory Instron machine, is about 8 lb./inch width, while that of a control pressing prepared from untreated copper foil is about 4.2 lb./inch width.

Example 7

A sheet of copper foil prepared as in the foregoing Example is immersed in a solution of 1.5 gram of the condensation product of the pseudo acid chloride of benzotriazole-5-carboxylic acid and polyethylene imine (M.W. ca. 6000; supplied by the Dow Chemical Co. as PEI600) at 70° for 30 minutes and then washed first with water, then with acetone and dried. A printed circuit laminate prepared from this material as in the foregoing Example has a bond strength of about 8.6 lb./inch width.

Example 8

A six inch square of electrolytic copper foil having one dendritic face and typical of the material used in the manufacture of printed circuit laminates is degreased with trichloroethylene and immersed in a solution of 0.5 gram of 5-[2,4-bis-(di - β - hydroxyethylamino)-s-triazine-6-ylamino]-benzotriazole in 2 ml. of 2N sodium carbonate solution and 95 ml. of water at room temperature for 10 minutes and then washed first with water; then with acetone and air dried.

A printed circuit laminate is then produced by heating the copper foil with the dendritic face in contact with 10 layers of glass cloth, impregnated with an epoxy resin, at 170° for 30 minutes under a pressure of 1000 p.s.i. The peel strength of the bond between the copper foil and the substrate, as measured on a laboratory Instron machine, is about 10.5 lb. per inch width, while that of a similar laminate prepared from untreated copper foil is about 8.5 lb. per inch width.

When the 5-[2,4-bis - (di-β-hydroxyethylamino)-s-triazine-6-ylamino]-benzotriazole used in this Example is replaced by 0.5 gram of the compound in column I of the following Table a laminate is obtained having the peel strength shown in column II of the Table:

| I | II (Lb. p.i.w.) |
|---|---|
| 5-(2,4-diaminophenylazo)-benzotriazole | 10 |
| 5-(2,4-dichloro-s-triazine-6-ylamino)-benzotriazole | 9.5 |
| Condensation product of benzotriazole-5-carboxylic acid chloride and polyethylene imine of M.W. ca. 6000 | 11 |
| 5-(ε-aminocaproylamino)-benzotriazole | 11 |

Example 9

A six inch square of a dendritic copper foil is degreased with trichloroethylene and immersed in a solution of 1.0 gram of 5-[4-bis-(β-hydroxyethyl)-aminophenylazo]-benzotriazole in 5 ml. of 2N acetic acid and 95 ml. of water at 60° for 10 minutes and then washed first with water, then with acetone and air dried. A printed circuit laminate prepared from this material as in the foregoing Example has a bond strength of about 5.7 lb. per inch width while a similar laminate prepared from the untreated foil has a bond strength of about 4.2 lb. per inch width. When the 5-[4-bis-(β-hydroxyethyl)-aminophenylazo]-benzotriazole used in this Example is replaced by 0.5 gram of the compounds in column I of the following Table a laminate is obtained having the peel strength shown in column II of the Table:

| I | II (Lb. p.i.w.) |
|---|---|
| 5-(2,4-dihydroxyphenylazo)-benzotriazole | 5.5 |
| 5-(2,4,6-trihydroxyphenylazo)-benzotriazole | 7.3 |

Example 10

Copper strips, one inch wide, four inches long, and 1/16" thick are cleaned by sandblasting and degreased with trichloroethylene. One pair of strips is immersed in a solution of 0.5 gram of the compound in column I of the Table in a mixture of 5 ml. of 2N sodium carbonate solution and 95 ml. water for 10 minutes and then washed with acetone and dried in air.

Two strips are bonded together by means of Nylon 12 in a press at 210° for 30 seconds, the area of overlap being approximately 1 square inch. The tensile shear strength of the joints is given in column II of the table. Untreated strips provided a bond strength of about 100 lb./sq. inch.

| I | II (Lb./sq. inch) |
|---|---|
| 5-[4-di-(γ-chloro - β - hydroxypropyl)-aminophenyl azo]-benzotriazole | 500 |
| 5-(2,4-dichloro-s-triazin-5-yl)-aminobenzotriazole | 1400 |
| 5-[4-di-(β - γ - epoxypropyl)aminophenylazo]-benzotriazole | 550 |

Example 11

Copper foil of dimensions 6 in. by 6 in. by 0.004 in. is cleaned by rubbing with "Scotchbrite" and degreased with trichloroethylene. One piece of foil is immersed in a solution of 0.5 grams of 5-[4-di-(γ-chloro-β-hydroxypropyl)-amino-phenylazo]-benzotriazole in a mixture of 5 ml. of 2N sodium carbonate solution and 95 ml. of water at room temperature for 10 minutes and then washed first with water, then with acetone and air dried.

A laminate is prepared by heating the copper foil in contact with 0.002" thick Maranyl D100 film (Maranyl is a registered trademark) under pressure at 180° for 2 minutes. The peel strength of the composite is then measured by peeling the Maranyl D100 film from the copper foil in a laboratory Instron machine. The bond strength obtained by this process is about 20 lb./inch width (cohesive failure), while the peel strength of a similar composite produced from untreated copper was about 9 lb./inch width.

Example 12

Copper foil of dimensions 6 in. by 6 in. by 0.004 in. is cleaned by rubbing with "Scotchbrite" and degreased with trichloroethylene. Two pieces of foil are immersed in a solution of 1.5 grams 5-[4-di(γ-chloro-β-hydroxypropyl) amino-phenylazo]benzotriazole in a mixture of 15 ml. of 2N sodium carbonate solution and 285 ml. of water at room temperature for 10 minutes and then washed first with water, then with acetone and air dried.

A laminate is prepared by interleaving the two strips of copper foil with 0.002" thick Maranyl D100 film and heating the composite under pressure at 180° for 2 minutes. The T-peel strength of the laminate is then measured by separating the two pieces of copper foil in a laboratory Instron machine. The bond strength obtained by this process is about 31 lb./inch width, while the peel strength of a similar laminate produced from untreated copper is about 15 lb./inch width.

Example 13

The foregoing Example is repeated using a solution of 1.5 grams of 5-[4-di(γ-chloro-β-hydroxypropyl)-amino-phenylazo]-benzotriazole in a mixture of 15 ml. of 2N sodium carbonate and 2985 ml. of water. The bond strength obtained by this process is about 42 lb./inch width.

Example 14

The foregoing Example is repeated using a solution of 1.5 grams of 5-[4-di-(γ-chloro-β-hydroxypropyl)amino]- benzotriazole in a mixture of 15 ml. of 2N sodium carbonate solution and 29,985 ml. of water. The bond strength obtained by this process is about 44 lb./inch width.

Example 15

Copper strips, one inch wide, four inches long and 1/16" thick, are cleaned by sand blasting and degreased with trichloroethylene. One pair of strips is immersed in a solution of one gram of 5-[4-di-(β-acryloylaminoethyl)aminophenylazo]-benzotriazole in a mixture of 23 ml. of N/10 sodium hydroxide solution and 77 ml. of water for 30 minutes and then washed with acetone and dried in air.

An adhesive composition is prepared by mixing 25 parts of a partially polymerised methyl methacrylate sold under the trade name Tensol 7 Component A with 1 part of Component B at room temperature. A few drops of the adhesive composition is applied to each of the copper strips and the pairs of strips are clamped together, the adhesive forming a bond between about 1 square inch of each of the two strips in each pair. The adhesive is then allowed to cure at room temperature for 48 hours. The bond strength obtained by this process is about 2000 lb. per square inch while strips which had not been immersed in a solution of 5-[4-di-(β-acryloylaminoethyl)aminophenylazol]-benzotriazole provided a bond strength of about 130 lb. per square inch.

When the 5-[4-di-(β-acryloylaminoethyl)aminophenylazo]-benzotriazole used in the foregoing Example is replaced by 1 gram of the compound in column I of the following table a bond is obtained having the tensile shear strength given in column II of the Table:

| I | II (Lb./sq. in.) |
|---|---|
| 4-[3,5 - di(acryloylamino) - 4 - methylphenylazo-7-aminobenzotriazole | 1900 |
| 5-Acryloylaminobenzotriazole | 1400 |
| 5-ε-(acryloylamino)-capropylaminobenzotriazole | 1000 |
| 5-[4-(di-acryloyloxyethyl)amino - 2 - methylphenylazo]-benzotriazole | 800 |

Example 16

Copper strips, one inch wide, four inches long, and 1/16" thick are cleaned by sand blasting and degreased with trichloroethylene. Two strips are bonded together by the method described in Example 15 using a mixture of 1 part of Tensol 7 Component B and 25 parts of a 0.5% solution of 5-[4-di-(β-acryloylaminoethyl)-aminophenylazo]-benzotriazole in Tensol 7 Component A. The bond strength obtained by this process is about 1750 lb./sq. inch while strips which had been bonded together with the unmodified adhesive provided a bond strength of about 130 lb./sq. inch.

Example 17

Copper strips, one inch wide, four inches long, and 1/16" thick are cleaned by rubbing with "Scotchbrite" and degreased with trichloroethylene. Sheets of copper foil, four inches long, one inch wide, and 0.004" thick are similarly cleaned. One strip and one sheet of the copper foil are immersed in a solution of one gram of 5-[4-di(β-acryloylaminoethyl)aminophenylazo]-benzotriazole in a mixture of 23 ml. of N/10 sodium hydroxide solution and 77 ml. of water for 30 minutes and then washed with acetone and dried in air.

An adhesive composition is prepared as described in Example 15 and a thin film of this is spread on the copper strip and the copper foil. The foil and the strip are clamped together and the adhesive is allowed to cure at room temperature for 48 hours. The peel strength of the joint is then tested by peeling the foil from the strip on a laboratory Instron machine. The bond strength obtained by this process is about 4½ lb./inch width, while the peel strength of a similar laminate produced from untreated copper was less than ½ lb./inch width.

Example 18

Example 17 was repeated using 1 gram of 5-acryloylaminobenzotriazole in place of the 1 gram of 5-[4-di(p-acryloylaminoethyl)aminophenylazo] - benzotriazole. The peel strength of the laminate is about 3½ lb./inch width.

Example 19

Copper strips, one inch wide, four inches long and 1/16" thick, are cleaned by rubbing with "Scotchbrite" and degreased with trichloroethylene. One pair of strips is immersed in a solution of 2.0 grams of 5-[4-di(β-acryloylaminoethyl)aminophenylazo]-benzotriazole in 2.3 ml. of 2N sodium hydroxide solution and 100 ml. of water for 30 minutes and then washed with acetone and dried in air.

The copper strips are then bonded together with a one inch square of glass fibre tissue impregnated with an unsaturated polyester resin, sold by the Strand Fibreglass Co. as Resin A, containing 1% of the same Company's catalyst and the composite is allowed to cure at room temperature for 48 hours. The bond strength obtained by this process is about 1600 lb./square inch while strips which had not been immersed in a solution of 5-[4-di-(β-acryloylaminoethyl)aminophenylazo] - benzotriazole provided bond strength of 1000 lb./square inch.

Example 20

Copper strips 1" x 4" x 1/16" are cleaned by sand blasting and degreased with trichloroethylene. One pair of strips is immersed in a solution of 0.5 grams of 5-(2,4,6-trihydroxyphenylazo)-benzotriazole in a mixture of 5 ml. of 2N sodium carbonate solution and 95 ml. of water at room temperature for 10 minutes and then washed first with water, then with acetone and air dried.

An adhesive composition is prepared by mixing 9 parts of a 40% solution of a hydroxyl-ended polyesteramide/diisocyanate condensate in methyl ethyl ketone and 1 part of an isocyante-ended condensate of polyhydric alcohols and tolylene diisocyanates at room temperature. A few drops of the adhesive composition is applied to each of the copper strips and the pair of strips are clamped together, the adhesive forming a bond between about 1 square inch of each of the two strips in each pair. The strips are then stored at room temperature for 7 days. The bond obtained by this process is about 250 lb. per square inch while strips which had not been immersed in a solution of 5-(2,4,6-trihydroxyphenylazo)-benzotriazole provided a bond strength of about 130 lbs. per square inch.

Example 21

Copper strips, one inch wide, four inches long, and 1/16" thick are cleaned by rubbing with "Scotchbrite" and degreased with trichloroethylene. One pair of strips is immersed in a solution of one gram of 5-acryloylaminobenzimidazole in 2.5 ml. of 2N sodium hydroxide solution and 200 ml. water at room temperature for 10 minutes and then washed first with water, then with acetone and air dried.

An adhesive composition is prepared by mixing 25 parts of Component A of an acrylic cement sold under the trade name "Tensol" cement No. 7 with one part of Component B and a few drops of the adhesive composition are applied to the end of the copper strips. Pairs of copper strips are clamped together, the adhesive forming a bond between about one square inch of each of the two strips in each pair. The strips are then allowed to stand at room temperature for 48 hours when the tensile shear strength of the joints is measured by pulling the strips apart on a laboratory Instron machine. The strips treated with 5-acryloylaminobenzimidazole provided a bond strength of about 400 lb. per square inch while untreated strips provided a bond strength of about 100 lb. per square inch.

When the 5-acryloylaminobenzimidazole used in this Example is replaced by the compound in column I of the following Table, joints are obtained having the bond strength shown in column 2 of the Table.

| I | II |
|---|---|
| | Lb./sq.in. |
| Sodium - N,N - di(β-acryloylaminoethyl)-dithio-carbamate | 900 |
| 5-Acrylylamino-2-mercaptobenzothiazole | 470 |
| 4-(β-acrylylaminoethyl)-imidazole | 490 |
| Sodium-N-ω-acryloylaminohexyl-dithiocarbamate | 530 |

Example 22

Silver plated copper strips, one inch wide, four inches long, and 1/16" thick are degreased with trichloroethylene. One pair of strips is immersed in a solution of one gram of 5-[4-bis-(β-acrylylaminoethyl)aminophenylazo]-benzotriazole in a mixture 1.5 ml. of 2N sodium hydroxide solution and 100 ml. water at room temperature for 30 minutes and then wash first with water, then with acetone and air dried. Two strips are bonded together by the method described in Example 21. The bond strength obtained by this process is about 580 lb./square inch while strips which had not been immersed in a solution of 5-[4 - bis(β - acryloylaminoethyl)aminophenylazo]-benzotriazole provided a bond strength of about 280 lb./square inch.

Example 23

Sheets of copper foil of dimension 6 in. by 1 in. by 0.004 in. are cleaned by rubbing with "Scotchbrite" and degreased with trichloroethylene. One pair of sheets is immersed in a solution of 0.5 gram of 5-[4-bis-(γ-chloro-β - hydroxypropyl)aminophenylazo] - benzotriazole in a mixture of 2.5 ml. of 2N sodium carbonate solution and 97.5 ml. of water at room temperature for 10 minutes and then washed first with water, then with acetone and air dried. Two sheets are then bonded together by heating a composite of the two sheets interleaved with Maranyl D100 under pressure at 180° for 2 minutes. The peel strength of the bond as measured on a laboratory Instron machine is about 34 lb. per inch width while sheets which had not been immersed in a solution of 5-[4-bis-(γ-chloro-β - hydroxypropyl)aminophenylazo] - benzotriazole provided a peel strength of about 10 lb. per inch width.

When sheets of foil were treated in a similar manner with solution of 5-[4-bis-(γ-chloro-β-hydroxypropyl)-aminophenylazo]-benzotriazole at the strength shown in column I of the Table and bonded together in a similar way laminates were obtained having the peel strengths given in column II of the Table.

| I | II |
|---|---|
| | (Lb./inch width) |
| 0.05% w./v. | 42 |
| 0.005% w./v. | 43 |
| 0.005% w./v. | 44 |
| 0.00005% w./v. | 7 |

We claim:

1. A process for bonding copper, silver or cadmium or an alloy based on one or more of these metals to a polymer selected from the group consisting of polymethacrylates, polyamides, polyesters, polyurethanes, polyepoxides, urea/formaldehyde resins, melamine/formaldehyde resins and phenyl/formaldehdye resins which comprises the steps in succession of treating the surface of the copper, silver or cadmium or alloy thereof with a benzotriazole carrying an amino, epoxyalkyl, hydroxy, chloro, chlorohydroxyalkyl, carboxy, acryloyl or methacryloyl group attached to the benzene nucleus through a linking group which is an alkylene, arylene, alkyleneimino, carbonimido, phenyleneazo, triazinylimino, oxy, or imino group or combination of one or more of these groups, and then bringing the treated metal or alloy surface into contact with the polymer.

2. A process as claimed in Claim 1 wherein the polymer is prepared in contact with the metal.

3. A process as claimed in Claim 1 wherein the copper, silver or cadmium or alloy is treated with the complex-forming compound dissolved in an aqueous medium.

4. A process as claimed in claim 1 wherein the benzotriazole carries an amino group attached to an alkylene group.

5. A process as claimed in claim 1 wherein the benzotriazole carries a chloro group attached to a triazinylimino group.

6. A process as claimed in claim 1 wherein the benzotriazole carries a chlorohydroxyalkyl group attached to an imino group.

7. A process as claimed in claim 1 wherein the benzotriazole carries an acryloyl group attached to an imino group.

References Cited

UNITED STATES PATENTS

| | | | |
|---|---|---|---|
| 3,318,728 | 5/1967 | Lilyquist | 117—132 |
| 3,334,054 | 8/1967 | Howard et al. | 252—390 |
| 3,367,907 | 2/1968 | Hansen | 260—45.8 |
| 3,397,187 | 8/1968 | Mecum | 260—79 |
| 3,471,453 | 10/1969 | Rabilloud et al. | 260—78 |
| 3,531,414 | 9/1970 | Randell et al | 252—152 |
| 3,553,101 | 1/1971 | Foroulis | 208—47 |
| 3,653,931 | 4/1972 | Borchert et al. | 106—3 |
| 3,673,152 | 6/1972 | Minagawa et al. | 260—45.8 N |

CHARLES E. VAN HORN, Primary Examiner

R. A. DAWSON, Assistant Examiner

U.S. Cl. X.R.

117—75, 218, 219, 230; 148—31.5; 260—45.8 N, 308 B